United States Patent [19]

Hargrove et al.

[11] Patent Number: 4,693,271
[45] Date of Patent: Sep. 15, 1987

[54] HORIZONTALLY MOUNTED SUBMERSIBLE PUMP ASSEMBLY

[76] Inventors: Benjamin F. Hargrove, Rte. 9, Box 192B; Billy J. Kvaternik, Rte. 6, Box 255½, both of West Monroe, La. 71291

[21] Appl. No.: 789,321

[22] Filed: Oct. 21, 1985

[51] Int. Cl.[4] .................. F04B 35/04; F04B 41/00
[52] U.S. Cl. ................................. 137/565; 137/571; 137/590; 251/293; 417/360
[58] Field of Search .............. 137/565, 571, 572, 590; 251/293, 315; 417/360

[56] References Cited

U.S. PATENT DOCUMENTS

| | | | |
|---|---|---|---|
| 1,443,231 | 1/1923 | McCaulley | 251/293 X |
| 1,972,496 | 9/1934 | Schlimbach | 137/565 |
| 2,034,790 | 3/1936 | Arutunoff | 137/565 X |
| 2,091,344 | 8/1937 | Waterfall | 137/565 X |
| 2,475,918 | 7/1949 | Ruth | 137/565 |
| 2,840,119 | 6/1958 | Gavin | 137/565 X |
| 3,008,333 | 11/1961 | Kircher | 137/590 X |
| 3,149,472 | 9/1964 | McCall et al. | 137/565 X |
| 3,636,972 | 1/1972 | Staramucci | 251/315 X |
| 4,404,988 | 9/1983 | Trammell | 137/565 |
| 4,500,263 | 2/1985 | Mohn | 417/360 |

Primary Examiner—Alan Cohan
Assistant Examiner—John A. Rivell
Attorney, Agent, or Firm—John M. Harrison

[57] ABSTRACT

A horizontally mounted submerisible pump assembly for pumping water from water storage tanks, which pump assembly is characterized by a submersible pump mounted inside a horizontally oriented tube extending through the wall of a water storage tank. A valve is provided in cooperation with the immersed end of the tube to facilitate flow of water into the tube to the pump and the opposite, dry end of the tube is closed by an adapter flange mounted on a length of adapter pipe, one end of which extends into the tube and communicates with the discharge of the pump and the other end of which is flanged to a water distribution line. The water distribution line extends to a conventional pressure tank for distributing water to multiple users on demand. The submersible pump is typically of turbine design and is sized to quickly and efficiently pressurize the water distribution system by pumping water from the storage tank and the flooded tube to the pressure tank. The tube enclosing the pump facilitates removal and replacement of the pump from the dry end of the tube without draining the storage tank.

3 Claims, 8 Drawing Figures

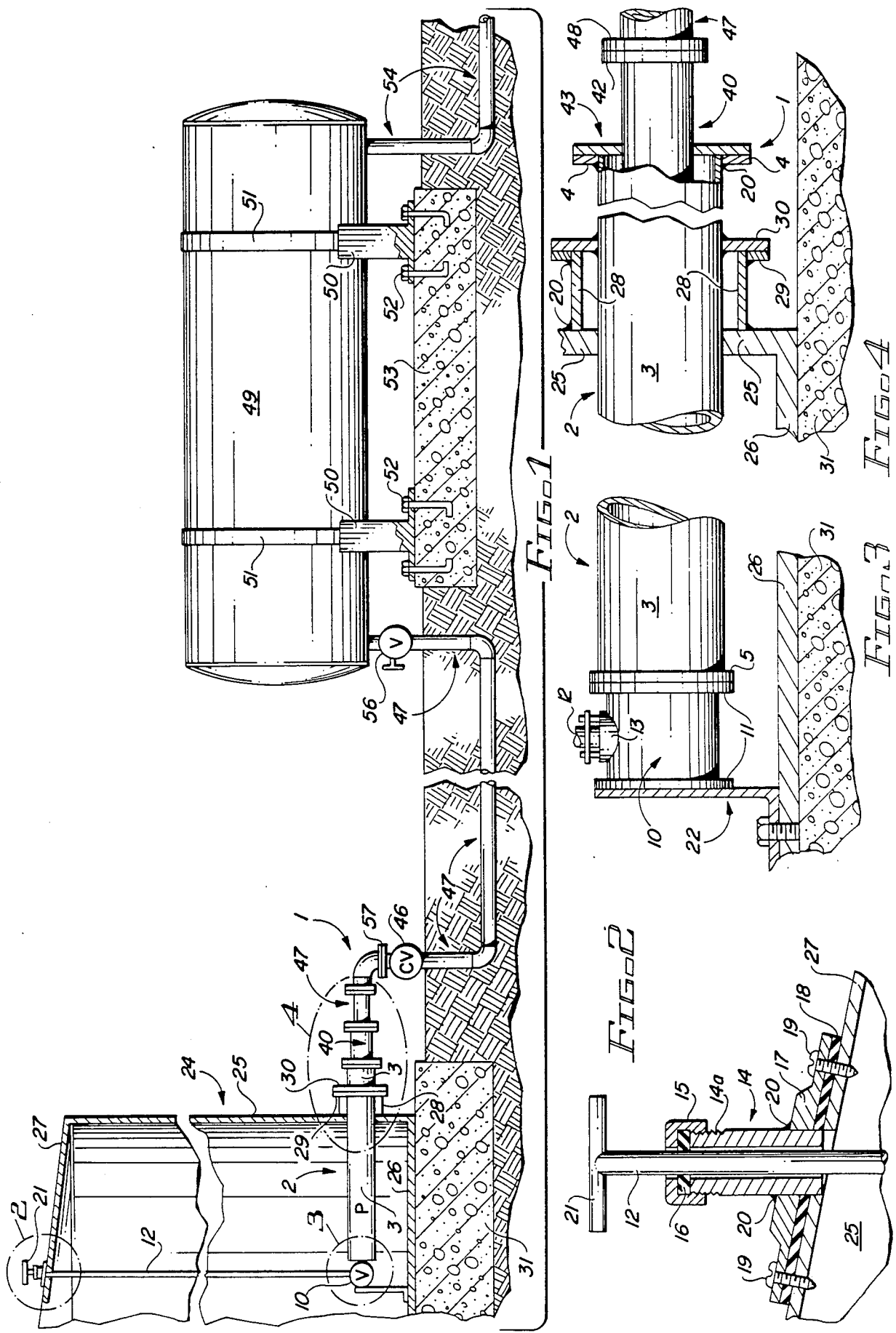

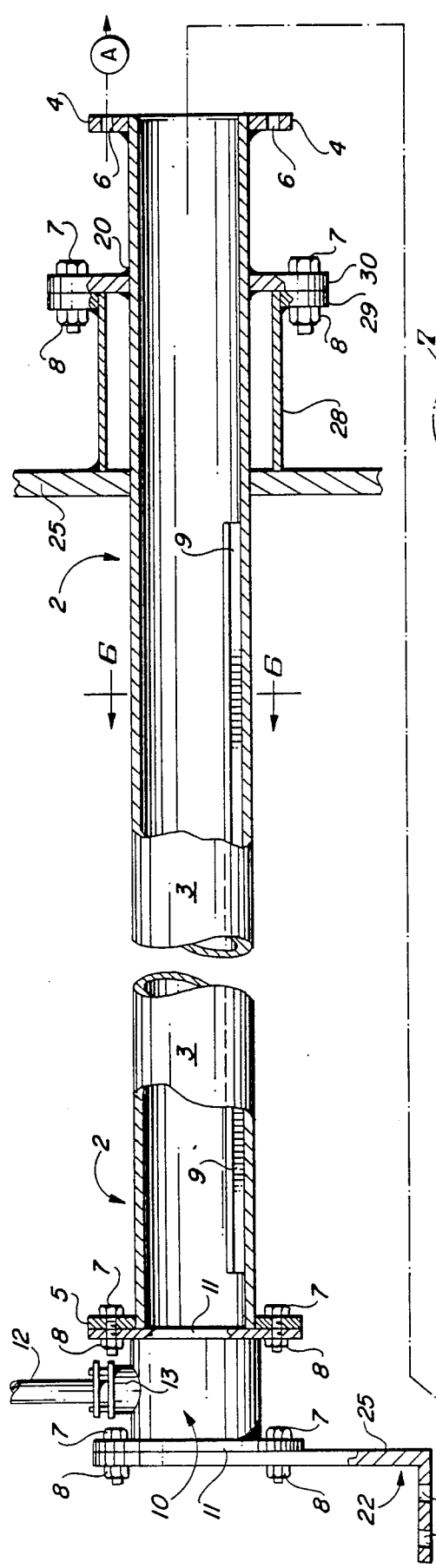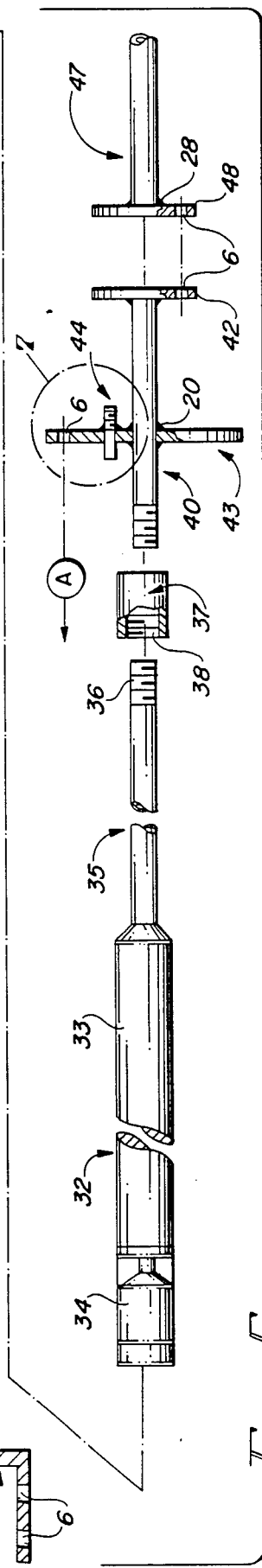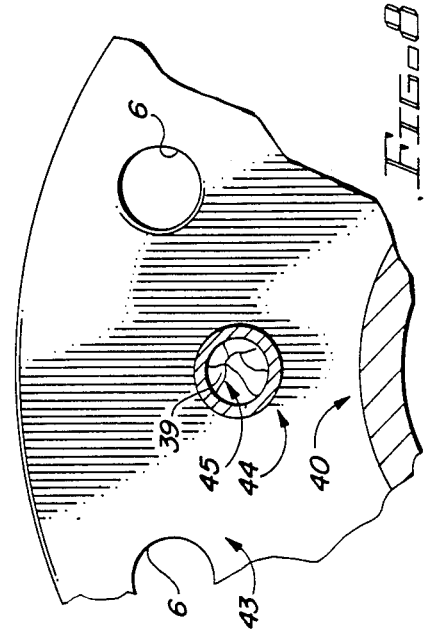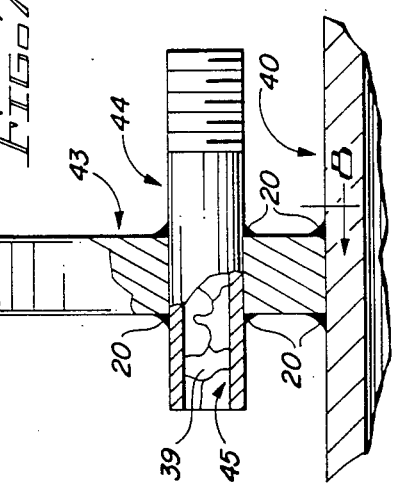

HORIZONTALLY MOUNTED SUBMERSIBLE PUMP ASSEMBLY

BACKGROUND OF THE INVENTION

1. Field of the Invention

This invention relates to water distribution systems and more particularly, to a horizontally-mounted submersible pump assembly for distributing water from a water supply or storage tank to a pressure tank and maintaining water pressure in the pressure tank at a desired level. The horizontally-mounted submersible pump assembly of this invention is characterized by a submersible down-hole or well pump which is mounted inside a tube extending into a water supply tank in horizontal orientation. The immersed end of the tube is attached to a gate or butterfly valve for admitting water into the tube and flooding the pump and the opposite end of the tube extends through the wall of the storage tank and is flanged to an adapter pipe which communicates with the pump discharge and a water line which extends to the pressure tank. The butterfly valve is operated by a long valve stem extending upwardly through the water in the storage tank and through the top of the storage tank and a valve handle terminates the valve stem to facilitate opening and closing of the butterfly valve from outside the storage tank. When the butterfly valve is open the submersible pump can be operated to pump water from the water storage tank through the tube and water line into the pressure tank. Pressure in the pressure tank can be maintained at a selected level and water can be delivered from the pressure tank on demand to end users by means of water distribution lines extending from the pressure tank. Maintenance or replacement of the submersible pump is achieved by closing the butterfly valve to prevent water from flowing into the tube, unflanging or disconnecting the pump from the tube, disconnecting the adapter pipe line and two additional flanges in the pressure line and removing the pump from the tube.

2. Description of the Prior Art

Many water supply systems, and particularly systems which are designed for application to rural areas, are typically designed using a water supply tank, one or more centrifugal pumps with appropriate piping and a pressure tank on the downstream or discharging side of the centrifugal pumps. The centrifugal pumps operate to deliver water from the water supply tank to the pressure tank and maintain a desired pressure in the pressure tank in order to supply water from the pressure tank at a desired line pressure to the end user or users on demand. One of the problems inherent in this type of water supply system is that of economically obtaining and maintaining the desired pressure in the pressure tank when the demand for water is high. Centrifugal pumps do not usually rapidly respond to such an increase in demand and the water pressure in the pressure tank frequently drops below that which is necessary to supply a good flow of water to the end user.

It has surprisingly been found that a normally vertically-oriented, down-hole submersible pump, such as a turbine pump, can be mounted in a horizontal configuration inside a tube located in the water supply or storage tank to quickly, economically, efficiently and adequately pressure a pressure tank in order to supply multiple end users with water originating from a supply or storage tank. It has further been found that substantially any such submersible well pump can be used in the invention to obtain the desired pressure characteristics. Of this class of pumps, multi-stage turbine pumps have been found to be particularly well suited to this application. It has also been found desirable to mount the submersible pump inside a tube provided in the tank and to control the flow of water into the tube by using a valve mounted on the submerged end of the tube in order to facilitate maintenance on the pump without the requirement of draining the tank.

Submersible pumps such as multi-stage turbine pumps as well known in the art for a variety of applications. One of the most popular applications for this type of pump is pumping water from water wells wherein the pump is suspended by means of a water pipe or line at a desired depth which corresponds to a water-producing sand. The pump is operable to pump water vertically upwardly from the sand through the pipe to an end user. Other applications include pumping water from underground aquifers through agricultural irrigation systems and also to water tanks for later distribution by gravity feed. Still other submersible pumps are used to pump fluids other than water in such applications as fuel recovery systems which are typified by the system disclosed in U.S. Pat. No. 4,197,883, dated Apr. 15, 1980, to Edward A. Mayer. The Mayer patent disclosed a submersible pump immersed in a reservoir for pumping gasoline to a gasoline pump and from the gasoline pump to the tank of a vehicle. U.S. Pat. No. 3,759,290, dated Sept. 18, 1973, to A. R. D'Alba, discloses a "Windshield Washer System Having Submerged Air Driven Pump". The pump disclosed in this patent is designed to pump solvent and includes a rotary assembly characterized by a pump impeller and a turbine wheel secured at opposite ends of a shaft. The shaft is journalled in a bearing disposed between the impeller and the turbine wheel and the assembly is mounted within a cylindrical housing. A source of compressed air is applied to opposite sides of the turbine wheel to power the pump and exits an exhaust port provided in the turbine wheel chamber.

It is an object of this invention to provide a new and improved horizontally-mounted submersible pump assembly which is designed to locate in a water storage tank and operates to deliver water from the tank at a desired pressure.

Another object of this invention is to provide a new and improved submersible pump assembly which includes a horizontally-mounted, down-hole submersible pump inserted in a tube located in a water supply tank for pumping water from the tube and the water supply tank to a pressure tank in order to supply water at selected pressure to end users.

Still another object of the invention is to provide a submersible pump assembly which is characterized by a submersible, down-hole pump which is inserted in a tube horizontally extending into a water supply tank, the submerged end of which tube is connected to a valve in order to facilitate selective water flow into the tube for contact with the pump, wherein the pump is operable to pump water from the tube into a pressure tank and to maintain the pressure in the pressure tank at a desired level for distributing water to end users on demand.

A still further object of the invention is to provide a submersible pump assembly for water distribution systems, which assembly is characterized by a down-hole, submersible well pump situated in a horizontally oriented tube extending through the wall of a water tank, wherein the submerged end of the tube is attached to a gate or butterfly valve to facilitate flow of water into the tube for flooding the pump and the opposite end of the tube which extends through the wall of the water tank is connected to an adapter flange. The adapter flange carries an adapter pipe which joins the pump discharge to a water line extending to a pressure tank, wherein the pump can be operated to pump water from the water tank through the tube, the adapter pipe and the pressure line into the pressure tank and maintain the water in the pressure tank at a selected pressure for distribution to end users on demand.

SUMMARY OF THE INVENTION

These and other objects of the invention are provided in a new and improved, horizontally-mounted submersible pump assembly which is characterized by a horizontally-oriented tube projecting into a water supply tank near the bottom of the tank and having a submerged open end connected to a valve such as a gate or butterfly valve, wherein water can be selectively introduced into the tube, and a submersible pump fitted in the tube with the pump discharge oriented in communication with a pressure line connecting the pump to a pressure tank, whereby operation of the pump to pump water at a selected pressure from the supply tank to the pressure tank is facilitated when the valve is open.

BRIEF DESCRIPTION OF THE DRAWINGS

The invention will be better understood by reference to the accompanying drawings, wherein:

FIG. 1 is a side elevation of the horizontally-mounted submersible pump assembly of this invention;

FIG. 2 is an enlarged sectional view of a preferred valve stem seal for the submersible pump assembly illustrated in FIG. 1;

FIG. 3 is a side elevation, partially in section, of the submerged end of the tube which contains the submersible pump and a butterfly valve provided in cooperation with the tube;

FIG. 4 is a side elevation, partially in section, of the opposite, or dry end of the tube, illustrating connection of the submersible pump to the tube and the submersible pump to the pressure line;

FIG. 5 is an exploded view, partially in section, of a preferred submersible pump and tube combination;

FIG. 6 is a sectional view of the tube, taken along line 6—6 in FIG. 5;

FIG. 7 is an enlarged view of one segment of an adapter flange used to connect the pump to the tube, more particularly illustrating a pipe nipple extending through the adapter flange; and FIG. 8 is a sectional view taken along line 8—8 in FIG. 7, of the pipe nipple extending through the adapter flange.

DESCRIPTION OF THE PREFERRED EMBODIMENTS

Referring now to FIG. 1 of the drawings, the submersible pump assembly of this invention is generally illustrated by reference numeral 1. The submersible pump assembly 1 is illustrated in cooperation with a conventional water storage and distribution system which includes a water tank 24, having a vertical round tank wall 25 and a tank bottom 26 seated on a tank foundation 31. A tapered tank top 27 closes the tank 24, as illustrated. A generally cylindrically-shaped pressure tank 49 is mounted on a pair of supports 50 which are secured to a pressure tank foundation 53 by means of anchor bolts 52. Straps 51 serve to stabilize the pressure tank 49 on the supports 50.

Referring now to FIGS. 1, 3 and 4 of the drawings in a preferred embodiment of the invention the submersible pump assembly 1 is characterized by a horizontally oriented tube 2, characterized by a cylindrically-shaped tube barrel 3, which is terminated at the dry end by an outside tube flange 4 and at the opposite immersed end by an inside tube flange 5. A butterfly valve 10 is mounted on the inside tube flange 5 by means of one of two parallel valve flanges 11, and serve to close the inside end of the tube barrel 3. The opposite valve flange 11 is attached to the upward standing leg of a valve support 22, which valve support 22 rests on the tank bottom 26 of the tank 24. The dry end of the tube barrel 3 projects through the tank wall 25 and is seated in a tube seal flange 30 which is extended from the tank wall 25 by means of a cylindrically-shaped tank neck 28. The tube seal flange 30 is, in turn, flanged to a neck flange 29, carried by the tank neck 28 and the projecting outside end of the tube barrel 3 is terminated by the outside tube flange 4, which is connected to an adapter flange 43.

Referring now to FIGS. 5 and 6 of the drawings in a preferred embodiment of the invention the bore of the tube barrel 3 is provided with longitudinally extending pump brackets 9, more particularly illustrated in FIG. 6, for supporting a submersible pump 32 located inside the tube barrel 3 of the tube 2. The motor 34 of the submersible pump 32 is positioned adjacent the butterfly valve 10 but inwardly of an on the tube side of the valve flange 11 which is attached to the inside tube flange 5 of the tube barrel 3. Accordingly, the pump housing 33 of the submersible pump 32, as well as the motor 34, is supported by the pump brackets 9, while the discharge pipe 35, provided with cooperating pipe threads 36 at the extending end thereof, projects toward the dry end of the tube 2. The discharge pipe 35 of the submersible pump 32 is attached to a length of adapter pipe 40, provided with adapter pipe threads 41 on the extending end thereof, by means of a collar 37 fitted with interior collar threads 38. Accordingly, the pipe 35, collar 37 and the projecting end of the adapter pipe 40 which is attached to the pipe 35, are enclosed inside the tube barrel 3 and the adapter flange 43 is flanged to the outside tube flange 4 of the tube barrel 3. The adapter pipe 40 extends through the adapter flange 43 and is welded therein by the weld 20. The opposite end of the adapter pipe 40 is terminated by an adapter pipe flange 42 which cooperates with the pressure line flange 48 of a system pressure line 47, as illustrated. In a most preferred embodiment of the invention the inside tube flange 5 is connected to the corresponding one of the valve flanges 11, and the neck flange 29 is secured to the tube seal flange 30, by means of flange bolts 7. The flange bolts 7 extend through flange bolt holes (not illustrated) in the inside tube flange 5, to threadibly register with corresponding nuts 8 and removably secure the inside tube flange 5 to the valve flange 11 and the neck flange 29 to the tube seal flange 30. Similarly, the adapter flange 43 is most preferably secured to the outside tube flange 4 and the adapter pipe flange 42 to the pressure line flange 48, by means of additional flange bolts (not illustrated) which register with spaced flange bolt holes 6 and receive additional cooperating nuts (not illustrated). Line flanges 57 are provided in the pressure line 47 in order to facilitate convenient removal of the submersible pump 32 from the tube 2, as hereinafter described.

Referring now to FIGS. 7 and 8 of the drawings in another most preferred embodiment of the invention, electrical wiring (not illustrated) which is necessary to operate the motor 34 of the submersible pump 32 is routed through the tube barrel 3 and through the nipple bore 45 of the nipple 44. The nipple bore 45 is sealed with a sealing material 39 such as a silicone base material, which is suitable for use with potable water. The electrical wiring extends from the nipple 44 to an appropriate source of electrical power (not illustrated) located outside the tank 24. The nipple 44 is sealed by a weld 20, in an aperture (not illustrated) provided in the adapter flange 43 in order to prevent water from leaking through the adapter flange 43 from the interior of the tank 24.

Referring again to FIGS. 1 and 2 of the drawings in another most preferred embodiment of the invention the butterfly valve 10 is fitted with a long valve stem 12 which extends through the tank top 27 and vertically through the interior of the tank 24 to communicate with the valve neck 13 of the butterfly valve 10. The bottom end of the valve stem 12 is inserted in the valve neck 13 and cooperates with a gate (not illustrated) provided in the butterfly valve 10. The opposite end of the valve stem 12 is seated in a stem seal 14, as is more particularly illustrated in FIG. 2. The stem seal 14 is provided with seal threads 14 at the upper end, which seal threads 14 accommodate a seal cap 15, from which the extending end of the valve stem 12 projects. A seal gasket is located between the seal cap 15 and the threaded end of the stem seal 14 to seal the valve stem 12 in the stem seal 14. A valve handle 21 is provided on the extending end of the valve stem 12 for rotating the valve stem 12 and opening and closing the gate in the butterfly valve 10. A seal flange 17 is welded to the stem seal 14 in angular relationship in order to accommodate the angular pitch of the tank top 27 and a flange gasket 18 is located between the bottom surface of the seal flange 17 and the top surface of the tank top 27 to prevent rain water from entering the tank 24 through the stem seal 14. Flange screws 19 serve to tightly secure the seal flange 17 to the tank top 27.

Referring again to FIG. 1 of the drawings, the pressure line 47 is attached to the adapter pipe 40 by means of the adapter pipe flange 42 and the pressure line flange 48, as heretofore described. A check valve 46 is provided in the pressure line 47 near the point of attachment of the pressure line 47 to the adapter pipe 40 and the pressure line 47 extends beneath the ground level 55 outside of the tank 24 to emerge beneath one end of a pressure tank 49. A pressure line valve 56 is seated in the pressure line 47 at this point in the water distribution system and water can be pumped by the submersible pump 32 from the water tank 24 through the tube 2 and the pressure line 47 into the pressure tank 49 at a desired pressure. A system line 54 is connected to the pressure tank 49 at the opposite end from the pressure line 47 connection and extends downwardly below the ground level 55 to supply one or more end users.

In operation, when it is desired to use the submersible pump assembly 1 of this invention, the water tank 24 is initially filled with water from a well or other source by a conventional pumping system (not illustrated) and the gate in the butterfly valve 10 is opened by manipulating the valve handle 21 and valve stem 12 in the counterclockwise direction to allow water to flow from the water tank 24 into the tube barrel 3 of the tube 2. When water has flooded the tube 2, the pump motor 34 is energized by appropriate controls and equipment (not illustrated) and water is pumped from the tube barrel 3 and the water tank 24 through the discharge pipe 35, adapter pipe 40 and pressure line 47, into the pressure tank 49. The submersible pump 32 is operated for a sufficient length of time to pressurize the pressure tank 49 in order to establish and maintain a system pressure which facilitates a desired volume of water flow through the system line 54 to end users.

It will be appreciated by those skilled in the art that a single submersible pump 32 can be inserted in each additional tube 2 located in the water tank 24, depending upon the desired volume of water flow from the water tank 24 to the pressure tank 49 and the desired pressure to be maintained in the pressure tank 49. Furthermore, while the existence of each tube 2 inside the water tank 24 for containing one of the submersible pumps 32 is desirable for servicing one tube while the other is operating, it will be appreciated that one or more submersible pumps 32 can be inserted in the tank 24 without using a tube 2, if desired. However, under the latter circumstances, if a submersible pump 32 needs to be replaced for cleaning or maintenance purposes, the water tank 24 must first be drained to a level at least below the level of the submersible pump 32. In contrast, under circumstances where a submersible pump 32 is located in a tube barrel 3 of a tube 2, the submersible pump 32 can be removed from the tube 2 for maintenance purposes according to the following procedure: when it is desired to either maintain or replace the submersible pump 32, the butterfly valve 10 is initially closed by manipulating the valve handle 21 in the clockwise direction to prevent water from flowing from the water tank 24 into the tube barrel 3. The appropriate nuts 8 are then removed from corresponding flange bolts 7 located in the registering flange bolt holes 6 in the adapter flange 43 and the outside tube flange 4. The pressure line valve 56 is then closed and the cooperating adapter pipe flange 42 and pressure line flange 48, as well as the line flanges 57, are separated by removing additional nuts 8 and corresponding flange bolts 7. The entire adapter pipe 40 and submersible pump 32 can then be removed from the tube barrel 3 with loss of only that amount of water which is contained in the tube barrel 3. Since the butterfly valve 10 is closed, the water in the water tank 24 cannot flow through the tube barrel 3. The submersible pump 32 can then either be repaired or replaced, as necessary, and the flanging procedure is reversed to reattach the adapter flange 43 on the outside tube flange 4 and the pressure line 48 on the adapter pipe flange 42 using the appropriate flange bolts 7 and cooperating nuts 8.

Referring again to the drawings in another most preferred embodiment of the invention the tube 2 is constructed of stainless steel in order to minimize the corrosion effects of the water in the tank 24. Alternatively, the tube barrel 3 of the tube 2 can be galvanized or coated with an epoxy paint to minimize such corrosion. In a still further alternative, the tube barrel 3 of the tube 2 can be lined with or constructed of fiberglass or similar corrosion-resistant material other than metal, in order to both minimize corrosion and the expense of manufacture. Furthermore, the butterfly valve 10, as well as the valve stem 12 and the valve support 22, are most preferably fabricated of stainless steel or bronze.

It will be appreciated from a consideration of this invention that the submersible pump assembly 1 offers a high pumping efficiency, which is in the range of about 70% to 75%. In comparison, conventional centrifugal pumps operate at an efficiency of about 65%. The submersible pump assembly of this invention is easily maintained, uses less piping and is less expensive and more efficient regarding power consumption than the centrifugal pump counterpart. Furthermore, it has been found that the water system pressure tank 49 can be pressurized much faster using the submersible pump 32 in the submersible pump assembly 1, than is possible with conventional centrifugal pumps.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A submersible pump assembly for mounting in a water tank provided with a water distribution system, said submersible pump assembly comprising a cylindrically-shaped stainless steel tube extending into the water tank in horizontal relationship, with one end of said tube located inside the water tank and the opposite end of said tube projecting outside of the water tank; a butterfly valve carried by said one end of said tube for selectively allowing water to enter said tube; an elongated valve stem having one end seated in said butterfly valve and the opposite end of said valve stem projecting through the top of the water tank, said valve stem operable to open and close said butterfly valve from outside of the water tank; an elongated pump housing; a motor and a pumping mechanism enclosed in said pump housing; wiring for energizing said motor; and a discharge pipe extending from said pump housing through said opposite end of said tube, with said pump housing, said motor, said wiring and said discharge pipe located inside said tube; an adaptor flange mounted on said opposite end of said tube and an adaptor pipe carried by said adaptor flange, said adaptor pipe having one end extending inside said tube in communication with said discharge pipe of said submersible pump and the other end of said adaptor pipe attached to the water distribution piping; and nipple means projecting through said adaptor flange for receiving said wiring and channeling said wiring from said tube to a selected location outside of the water tank, for pumping water from said tube and the water tank through the water distribution piping when said butterfly valve is open.

2. In a water tank containing a supply of water and piping connected to the water tank for distribution of the water, the improvement comprising a submersible pump assembly characterized by an elongated tube horizontally mounted in the water tank, with one end of said tube located in the water tank and the opposite end of said tube extending from the water tank; a tank neck extending from said water tank, a tank flange terminating said tank neck and a tube mount flange carried by said tube and spaced from said opposite end of said tube, said tube mount flange bolted to said tank flange for removably securing said opposite end of said tube in the water tank; a valve mounted on said one end of said tube inside the water tank and communicating with the interior of said tube when said valve is open; an elongated valve stem having one end seated in said valve and the opposite end of said valve stem projecting through the top of the water tank and a handle carried by said opposite end of said valve stem, whereby said handle and said valve stem are operable to open and close said valve from outside of the water tank; a turbine pump characterized by an elongated pump housing; a motor and turbine pumping means enclosed in said housing; wiring for energizing said motor; and a discharge pipe extending from said pump housing toward said opposite end of said tube, said housing, said motor, said turbine pumping means and said wiring positioned in said tube and communicating with the piping for pumping water from said tube and the water tank through the piping when said valve is open; and adaptor flange mounted on said opposite end of said tube and an adaptor pipe carried by said adaptor flange, said adaptor pipe having one end extending inside said tube in communication with said discharge pipe and the other end of said adaptor pipe attached to the piping; and nipple means projecting through said adaptor flange for receiving said wiring and channeling said wiring from said tube to a selected location outside of the water tank.

3. In a water supply system having a water tank, a pressure tank and water distribution piping connecting the water tank to the pressure tank, the improvement comprising a submersible pump assembly characterized by a tube open at both ends and horizontally-mounted in the water tank, a tank neck extending from said water tank, a tank flange terminating said tank neck and a tube mount flange carried by said tube, said tube mount flange bolted to said tank flange for removably securing said tube in the water tank, with one end of said tube projecting inside the water tank and the opposite end of said tube extending through the wall of the water tank and located outside of the water tank; a valve carried by said one end of said tube and support means extending from the water tank to said valve for supporting said valve and said one end of said tube in the interior of the water tank; an elongated valve stem having one end seated in said valve and the opposite end of said valve stem projecting through the top of the water tank and a handle carried by said opposite end of said valve stem, whereby said handle and said valve stem are operable to open and close said valve from outside of the water tank; a tube flange terminating said opposite end of said tube and an adaptor flange bolted to said tube flange, said adaptor flange provided with an adaptor pipe having one end connected to the water distribution piping and the opposite end of said adaptor pipe extending inside said tube; and a submersible pump characterized by a turbine pump having an elongated pump housing, a motor and a turbine pumping mans enclosed in said housing, wiring for energizing said motor and a discharge pipe extending from said pump housing toward said opposite end of said tube, said pump housing, said motor, said turbine pumping means and said wiring positioned in said tube and said discharge pipe communicating with said opposite end of said adaptor pipe, whereby water is pumped by said submersible pump from said tube through said discharge pipe and the water distribution piping to the pressure tank when said valve is opened and said water floods said tube.

* * * * *